United States Patent
Holcman et al.

(10) Patent No.: US 7,346,032 B2
(45) Date of Patent: Mar. 18, 2008

(54) METHOD AND APPARATUS FOR EFFECTING HANDOFF BETWEEN DIFFERENT CELLULAR COMMUNICATIONS SYSTEMS

(75) Inventors: Alenjandro R. Holcman, San Diego, CA (US); Yoram Rimoni, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 927 days.

(21) Appl. No.: 10/077,094

(22) Filed: Feb. 14, 2002

(65) Prior Publication Data

US 2003/0108006 A1    Jun. 12, 2003

Related U.S. Application Data

(60) Provisional application No. 60/340,242, filed on Dec. 7, 2001.

(51) Int. Cl.
   *H04L 12/66* (2006.01)
   *H04Q 7/20* (2006.01)
(52) U.S. Cl. .................. 370/331; 370/328; 370/352; 370/410; 370/466; 455/436; 455/562
(58) Field of Classification Search ........ 370/328–333, 370/352, 410, 466; 455/422.1, 436–444, 455/562
See application file for complete search history.

(56) References Cited

U.S. PATENT DOCUMENTS

| 5,640,386 | A | * | 6/1997 | Wiedeman | 370/320 |
|---|---|---|---|---|---|
| 5,917,811 | A | * | 6/1999 | Weaver et al. | 370/332 |
| 5,978,679 | A | * | 11/1999 | Agre | 455/442 |
| 6,052,584 | A | * | 4/2000 | Harvey et al. | 455/423 |
| 6,266,529 | B1 | * | 7/2001 | Chheda | 455/436 |
| 6,438,117 | B1 | * | 8/2002 | Grilli et al. | 370/331 |
| 6,487,406 | B1 | * | 11/2002 | Chang et al. | 455/422.1 |
| 6,526,033 | B1 | * | 2/2003 | Wang et al. | 370/338 |
| 6,594,241 | B1 | * | 7/2003 | Malmlof | 370/329 |
| 6,603,761 | B1 | * | 8/2003 | Wang et al. | 370/352 |
| 6,681,115 | B1 | * | 1/2004 | McKenna et al. | 455/517 |
| 6,721,565 | B1 | * | 4/2004 | Ejzak et al. | 455/436 |
| 6,729,929 | B1 | * | 5/2004 | Sayers et al. | 455/446 |

(Continued)

*Primary Examiner*—Edan Orgad
*Assistant Examiner*—Venkatesh Haliyur
(74) *Attorney, Agent, or Firm*—Sandip Minhas; Alin Corie; Tom Rouse

(57) ABSTRACT

A method of effecting handoff of a mobile station from a first base station in a first cellular communications system controlled by a first mobile switching control station to a second base station in a second, different cellular system controlled by a second mobile switching control station is described. The method comprises measuring at the mobile station a parameter of a signal transmitted by said first base station and a parameter of a signal transmitted by said second base station. When the parameters reach a predetermined condition, a signal quality message is communicated from the mobile station via the first base station to said first mobile switching control station, which responds by generating information for a channel request message for the second mobile switching control station and transmitting the same to the mobile station. The mobile station generates from the information a channel request message for the second mobile switching control station and transmits the same to the second mobile switching control station. The second mobile switching control station generates channel information identifying a channel in the second communications system for the mobile station so that the handoff may be effected.

3 Claims, 5 Drawing Sheets

U.S. PATENT DOCUMENTS

| | | | |
|---|---|---|---|
| 6,782,264 B2 * | 8/2004 | Anderson | 455/456.1 |
| 6,871,070 B2 * | 3/2005 | Ejzak | 455/435.1 |
| 6,954,654 B2 * | 10/2005 | Ejzak | 455/560 |
| 6,965,585 B2 * | 11/2005 | Grilli et al. | 370/331 |
| 6,996,087 B2 * | 2/2006 | Ejzak | 370/338 |
| 6,996,387 B2 * | 2/2006 | Chan | 455/301 |
| 7,016,326 B2 * | 3/2006 | Holcman et al. | 370/331 |
| 7,127,264 B2 * | 10/2006 | Hronek et al. | 455/466 |
| 2003/0002525 A1 * | 1/2003 | Grilli et al. | 370/465 |

* cited by examiner

METHOD AND APPARATUS FOR EFFECTING HANDOFF BETWEEN DIFFERENT CELLULAR COMMUNICATIONS SYSTEMS

RELATED APPLICATIONS

This application claims priority from U.S. Provisional patent application entitled "Method and Apparatus for Effecting Handoff Between Different Cellular Communications Systems", Ser. No. 60/340,242, filed Dec. 7, 2001.

FIELD OF THE INVENTION

The present invention relates generally to a method of and apparatus for effecting handoff between different cellular communications systems.

DESCRIPTION OF THE RELATED ART

The so-called code division multiple access (CDMA) modulation technique is but one of several techniques for facilitating communications in which a large number of system users are present. Although other techniques, such as time division multiple access (TDMA), frequency division multiple access (FDMA) and AM modulation schemes such as amplitude companded single sideband (ACSSB) are also available, CDMA has significant advantages over these other modulation techniques. The use of CDMA techniques in a multiple access communication system is disclosed in U.S. Pat. No. 4,901,307 entitled "Spread Spectrum Multiple Access Communication System Using Satellite Or Terrestrial Repeaters", assigned to the present assignee, the disclosure of which is incorporated herein by reference.

In U.S. Pat. No. 4,901,307 a multiple access technique is described in which a large number of mobile telephone system users, each having a transceiver, communicate through satellite repeaters or terrestrial base stations (also known as cell base stations, or cell-sites) using code division multiple access (CDMA) spread spectrum communication signals. In using CDMA communications, the frequency spectrum can be reused multiple times thus permitting an increase in system user capacity. The use of CDMA techniques results in a much higher spectral efficiency than can be achieved using other multiple access techniques.

In conventional cellular telephone systems the available frequency band is divided into channels typically 30 KHz in bandwidth while analog FM modulation techniques are used. The system service area is divided geographically into cells of varying size. The available frequency channels are divided into sets with each set usually containing an equal number of channels. The frequency sets are assigned to cells in such a way as to minimize the possibility of co-channel interference. For example, consider a system in which there are seven frequency sets and the cells are equal size hexagons. A frequency set used in one cell will not be used in the six nearest or surrounding neighbors of that cell. Furthermore, the frequency set in one cell will not be used in the twelve next nearest neighbors of that cell.

In conventional cellular systems, the handoff scheme implemented is intended to allow a call or other type of connection (i.e., data link) to continue when a mobile station crosses the boundary between two cells. The handoff from one cell to another is initiated when the receiver in the cell base station handling the call or connection notices that the received signal strength from the mobile station falls below a predetermined threshold value. A low signal strength indication implies that the mobile station must be near the cell border. When the signal level falls below the predetermined threshold value, the base station asks the system controller to determine whether a neighboring base station receives the mobile station signal with better signal strength than the current base station.

The system controller in response to the current base station inquiry sends messages to the neighboring base stations with a handoff request. The base stations neighboring the current base station employ special scanning receivers which look for the signal from the mobile station on the specified channel. Should one of the neighboring base stations report an adequate signal level to the system controller, then a handoff will be attempted.

Handoff is then initiated when an idle channel from the channel set used in the new base station is selected. A control message is sent to the mobile station commanding it to switch from the current channel to the new channel. At the same time, the system controller switches the call from the first base station to the second base station.

In the conventional system a call will be discontinued if the handoff to the new base station is unsuccessful. There are many reasons that a failure in handoff may occur. Handoff can fail if there is no idle channel available in the neighboring cell for communicating the call. Handoff can also fail if another base station reports hearing the mobile station in question, when in fact this base station actually hears a different mobile station using the same channel in a completely different cell. This reporting error will result in the call being switched to a wrong cell, typically one in which signal strength is insufficient to maintain communications. Furthermore should the mobile station fail to hear the command to switch channels, the handoff will fail. Actual operating experience indicates that handoff failures occur frequently which questions the reliability of the system.

Another common problem in the conventional telephone system occurs when the mobile station is near the border between two cells. In this situation the signal level tends to fluctuate at both base stations. This signal level fluctuation results in a "ping-ponging" situation in which repeated requests are made to hand the call back and forth between the two base stations. Such additional unnecessary handoff requests increase the possibility of the mobile station incorrectly hearing the channel switch command or failing to hear the command at all. Furthermore, the ping-ponging situation raises the possibility that the call will be discontinued if it is inadvertently transferred to a cell in which all channels are currently in use and thus unavailable for accepting the handoff.

In U.S. Pat. No. 5,101,501, entitled "Method And System For Providing A Soft Handoff In Communications In A CDMA Cellular Telephone System", assigned to the present assignee, the disclosure of which is incorporated herein by reference, a method and system are disclosed for providing communication with the mobile station through more than one cell base station during the handoff. In this environment communication within the cellular system is uninterrupted by the eventual handoff from the base station corresponding to the cell from which the mobile station is exiting to the base station corresponding to the cell to which the mobile station is entering. This type of handoff may be considered as a "soft" handoff in communications between cell base stations with the mobile wherein two or more base station or sectors of base station transmit concurrently to the mobile station. The use of such "soft" handoff techniques has been found to substantially reduce the incidence of ping-ponging situations in which repeated handoff requests are made between a pair of base stations.

An improved soft handoff technique is disclosed within U.S. Pat. No. 5,267,261, entitled "Mobile Station Assisted Soft Handoff In A CDMA Cellular Communications System", assigned to the present assignee, the disclosure of which is incorporated herein by reference. The soft handoff technique is improved by measuring at the mobile station the strength of "pilot" signals transmitted by each base station within the system. These pilot strength measurements are of assistance in the soft handoff process by facilitating identification of viable base station handoff candidates.

The improved soft handoff technique prescribes that the mobile station monitors the signal strength of pilots from neighboring base stations. When the measured signal strength exceeds a given threshold, the mobile station sends a signal strength message to a system controller via the base station through which the mobile station is communicating. Command messages from the system controller to a new base station and to the mobile station establish contemporaneous communication through the new and current base stations. When the mobile station detects that signal strength of a pilot corresponding to at least one of the base stations through which the mobile station is communicating has fallen below a predetermined level, the mobile station reports the measured signal strength indicative of the corresponding base station to the system controller via the base stations through which it is communicating. Command messages from the system controller to the identified base station and the mobile station terminates communication through the corresponding base station while communications through the other base station or base stations continue.

Although the foregoing techniques are well suited to call transfers between cells in the same cellular system, a more difficult situation is presented by movement of the mobile station into a cell serviced by a base station from another cellular system. One complicating factor in such "intersystem" handoffs is that the neighboring cellular system often has dissimilar characteristics. For example, adjacent cellular systems will often operate at different frequencies, and may maintain different levels of base station output power or pilot strength. These differences effectively preclude the mobile station from performing the pilot strength comparisons and the like contemplated by existing mobile-assisted soft handoff techniques.

When resources are not available to conduct soft intersystem handoffs, the timing of the handoff of a call or connection from one system to another becomes critical if uninterrupted service is to be maintained. That is, the intersystem handoff must be executed at the time most likely to result in successful transfer of the call or connection between systems. In such a handoff, referred to herein as a hard handoff, communication between the mobile station and one system must cease before communication between the mobile station and the other system can begin. It follows that the handoff should be attempted only when, for example:

(i) an idle channel is available in the new cell,
(ii) the mobile station is actually within range of the new cell base station, but before it loses contact with the current cell base station, and
(iii) the mobile station is in a position at which it is assured of receiving the command to switch channels.

Ideally, each such hard intersystem handoff will be conducted in a manner which minimizes the potential for "ping-ponging" handoff requests between the base stations of different systems. However, this is made difficult as a result of the failure of existing handoff procedures to identify when, and through which base stations, the mobile station should supplied with new frequency and channel information and instructed to transfer the existing call or connection.

These and other shortcomings of existing intersystem handoff techniques impair the quality of cellular communications, and may be expected to further degrade performance as competing cellular systems continue to proliferate. Accordingly, there is a resulting need for an intersystem handoff technique capable of reliably directing the handoff of a call or connection between the base stations of different cellular communication systems.

U.S. Pat. No. 5,697,055, entitled "Mobile Station Assisted Soft Handoff In A CDMA Cellular Communications System", assigned to the present assignee, the disclosure of which is incorporated herein by reference, describes a method and system for performing an intersystem handoff of communication with a mobile station between base stations of first and second cellular systems. At the mobile station, a quantifiable parameter of a signal transmitted by a second base station of the second system is measured. When the measured value of the quantifiable parameter passes through a first predetermined level, the mobile station communicates a signal quality message via a first base station of the first system to a first mobile switching control station.

A channel request message is then communicated from the first mobile switching control station to a second mobile switching control station within the second system. At the second base station, a quantifiable parameter of the signal received from the mobile station is also measured. The second base station establishes communication with the mobile station when the measured value of the quantifiable parameter passes through a predetermined level. Alternatively, the signal strength of a first pilot signal transmitted by the first base station is measured at the mobile station. A handoff request message is then sent to the second base station when the measured signal strength of the first pilot signal becomes less than a second predetermined level, thereby mobile station communication to be established. The provision of a voice link between the mobile switching control stations allows for the forwarding of an existing connection between the first and second cellular systems, and enables the performance of soft intersystem handoffs.

While this arrangement works well for situations where both systems are CDMA based and therefore both capable of performing soft handoff, there remains the problem of how to handle inter-system handoff where one or more of the systems is unable to perform such a handoff. For example, the so-called GSM standard has no mechanism for a soft handoff. There is, therefore, a problem in handing off a call using the air interface from a CDMA network to a GSM network. Furthermore, GSM authentication cannot be done because the CDMA 2000 mechanisms cannot transfer the data required to do GSM authentication. Encryption in GSM is different than the encryption in CDMA 2000.

One way of dealing with this problem would be to modify GSM to enable it to effect handoff to a non-GSM system, e.g. a CDMA system. However, GSM has been established for a long time now, relatively speaking, and operators will be reluctant to make expensive modifications to existing equipment in order to accommodate a neighbouring incompatible system. If new messages are added to the air interface in support of dual-mode mobile stations, then modifications must be made to support these new messages. Plainly, this is undesirable form the perspective of the operator.

Another problem with handing off between a CDMA system and a GSM system is that CDMA and GSM authentication use two different methods and keys. The authentication methods in GSM and CDMA 1X are basically the same, but the keys have different sizes. CDMA 1X has additional procedures such as unique challenge and count methods, which respectively prevent channel hijacking and replay attacks.

SUMMARY OF THE INVENTION

The invention addresses the above-discussed problems.

According to one aspect of the invention there is provided a method of effecting handoff of a mobile station from a first base station in a first cellular communications system controlled by a first mobile switching control station to a second base station in a second, different cellular system controlled by a second mobile switching control station, the method comprising: measuring at the mobile station a parameter of a signal transmitted by said first base station; measuring at the mobile station a parameter of a signal transmitted by said second base station; communicating a signal quality message from the mobile station via the first base station to said first mobile switching control station, when the parameters reach a predetermined condition; generating at the first mobile switching control station information for a channel request message for the second mobile switching control station; communicating the information from said first mobile switching control station to said mobile station; generating at the mobile station from the information from the first mobile switching control station a channel request message for the second mobile switching control station; and communicating the channel request message from the mobile station to the second mobile switching control station.

According to another aspect of the invention there is provided a mobile station comprising: a first transceiver chain operable to receive and transmit signals with a first base station in a first cellular communications system; a second transceiver chain operable to receive and transmit signals with a second base station in a second cellular communications system; and a controller for: measuring a parameter of a signal transmitted by said first base station; measuring a parameter of a signal transmitted by said second base station; communicating a signal quality message from the mobile station via the first base station to said first cellular communications system, when the parameters reach a predetermined condition; receiving from the first base station information for a channel request message for the second cellular communications system; generating from the information from the first base station a channel request message for the second cellular communications system; and communicating the channel request message to the second mobile station.

The above and further features of the invention are set forth with particularity in the appended claims and together with advantages thereof will become clearer from consideration of the following detailed description of an exemplary embodiment of the invention given with reference to the accompanying drawings.

DETAILED DESCRIPTION OF AN EMBODIMENT OF THE INVENTION

Figure 1:
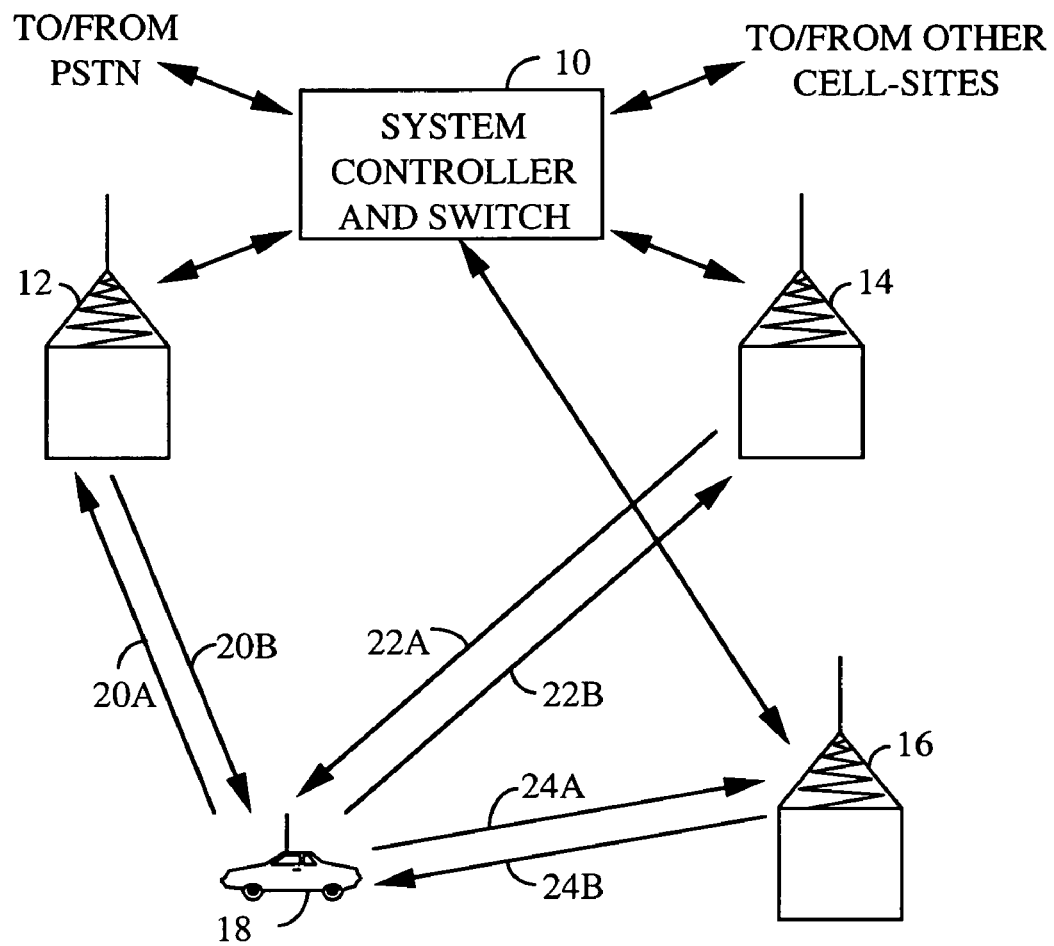
FIG. 1 is a schematic representation of a cellular system.

FIG. 1 is a schematic illustration of an exemplary cellular telephone system. The illustrated system may utilize any of various multiple access modulation techniques for facilitating communications between a typically large number of system mobile stations or mobile telephones, and the base stations. Such multiple access communication system techniques include: time division multiple access (TDMA), frequency division multiple access (FDMA), code division multiple access (CDMA), and AM modulation schemes such as amplitude companded single sideband. The spread spectrum modulation technique of CDMA, disclosed for example in the above-referenced U.S. Pat. No. 4,901,307, has significant advantages over other modulation techniques for multiple access communication systems and is therefore preferred.

In a typical CDMA system each base station transmits a unique pilot signal, which comprises the transmission of a "pilot carrier" upon a corresponding pilot channel. The pilot signal is an unmodulated, direct sequence, spread spectrum signal transmitted at all times by each base station using a common pseudorandom noise (PN) spreading code. The pilot signal allows the mobile stations to obtain initial system synchronization, i.e. timing, in addition to providing a phase reference for coherent demodulation and a reference for signal strength measurements used in handoff determination. The pilot signal as transmitted by each base station may often be the same PN spreading code, but with a different code phase offset.

In the system shown in FIG. 1, a system controller and switch 10, also referred to as a mobile switching center (MSC), typically includes interface and processing circuitry (not shown) for providing system control to plural base stations 12, 14 and 16. The controller 10 also controls the routing of telephone calls from the public switched telephone network (PSTN) to the appropriate base station for transmission to the appropriate mobile station. The controller 10 also controls the routing of calls from the mobile stations, via at least one base station to the PSTN. The controller 10 may direct calls between mobile users via the appropriate base station(s) since such mobile stations do not typically communicate directly with one another.

Controller 10 may be coupled to the base stations by various means such as dedicated telephone lines, optical fiber links or by microwave communication links. In FIG. 1, three such exemplary base stations, 12, 14 and 16 along with an exemplary mobile station 18, which includes a cellular telephone, are illustrated. Arrows 20*a* and 20*b* define the possible communication link between base station 12 and mobile station 18. Arrows 22*a* and 22*b* define the possible communication link between base station 14 and mobile station 18. Similarly, arrows 24*a* and 24*b* define the possible communication link between the base station 16 and the mobile station 18.

The base station service areas or cells are designed in geographic shapes such that the mobile station will normally be closest to one base station. When the mobile station is idle, i.e. no calls in progress, the mobile station constantly monitors the pilot signal transmissions from each nearby base station. As illustrated in FIG. 1 the pilot signals are transmitted to the mobile station 18 by the base stations 12, 14 and 16 upon the communication links 20*b*, 22*b* and 24*b*, respectively. The mobile station then determines which cell it is in by comparing pilot signal strength transmitted from these particular base stations.

In the example illustrated in FIG. 1, the mobile station 18 may be considered closest to base station 16. When the mobile station 18 initiates a call, a control message is transmitted to the nearest base station, here base station 16. Base station 16 upon receiving the call request message, signals the system controller 10 and transfers the call number. The system controller 10 then connects the call through the PSTN to the intended recipient.

Should a call be initiated within the PSTN, the controller 10 transmits the call information to all base stations in the area. The base stations in return transmit a paging message to the intended recipient mobile station. When the mobile station hears a page message, it responds with a control message that is transmitted to the nearest base station. This control message signals the system controller that this particular base station is in communication with the mobile station. The controller 10 then routes the call through the nearest base station to the mobile station.

Should the mobile station 18 move out of the coverage area of the initial base station, i.e. base station 16, an attempt is made to continue the call by routing the call through another base station. In the handoff process there are different methods of initiating the handoff of the call or routing through another base station.

In a base station initiated handoff method, the initial base station, base station 16, notices that the signal transmitted by the mobile station 18 has fallen below a certain threshold level. The base station 16 then transmits a handoff request to the system controller 10, which relays the request to all neighboring base stations 12, 14 of the base station 16. The controller-transmitted request includes information relating to the channel, including the PN code sequence used by mobile station 18. Base stations 12 and 14 tune a receiver to the channel being used by the mobile station and measure the signal strength, typically using digital techniques. If one of base stations 12 and 14 receivers report a stronger signal than the initial base station reported signal strength, then a handoff is made to that base station.

Alternatively, the mobile station itself may initiate a so-called mobile-assisted handoff. The base stations each transmit a pilot signal, which, among other things, identifies the base station. The mobile station is equipped with a search receiver that is used to scan the pilot signal transmission of the neighboring base stations 12 and 14, in addition to performing other functions. If the pilot signal of one of the neighbouring base stations 12 and 14 is found to be stronger than a given threshold, then the mobile station 18 transmits a message to this effect to the current base station 16.

An interactive process between the mobile station and the base station then permits the mobile station to communicate through the one or more of base stations 12, 14 and 16. During this process the mobile station identifies and measures the signal strength of the pilot signals that it receives. This information is communicated, via the base station(s) with which the mobile station is communicating, through to the MSC. The MSC, upon receiving this information, initiates or terminates connections between the mobile and base stations, thereby affecting the mobile-assisted handoff.

The foregoing process may also be considered to be a "soft" handoff in that the mobile station simultaneously communicates through more than one base station. During a soft handoff the MSC can combine or choose between the signals received from each base station with which the mobile unit is in communication during movement between different cells. In like manner the MSC may relay signals from the PSTN to each base station with which the mobile unit is in communication. Mobile-assisted handoffs tend to be more complex if the mobile station happens to be located within the coverage area of two or more base stations not within the same cellular system, i.e., not controlled by the same MSC.

Figure 2:
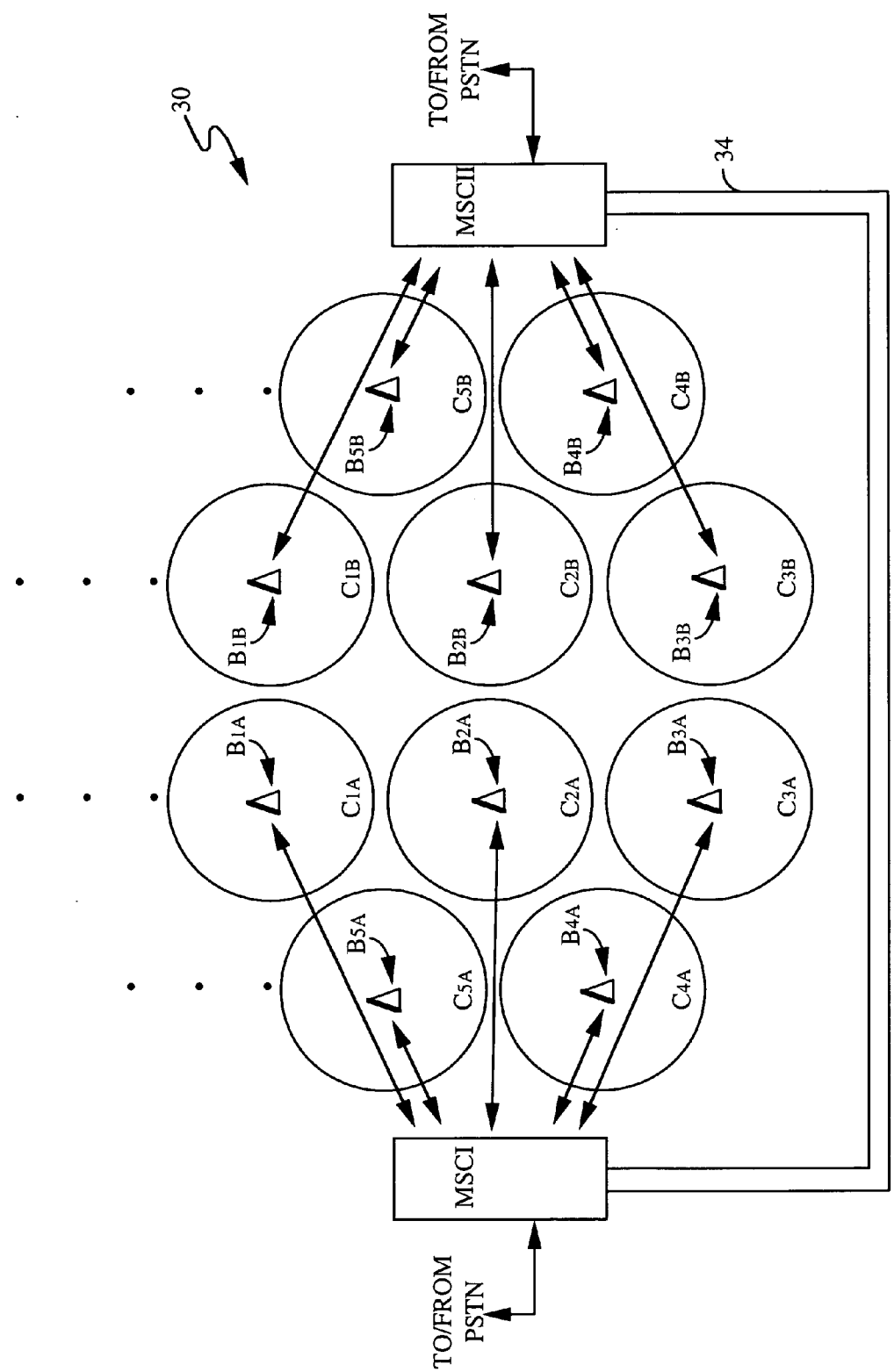
FIG. 2 is a schematic representation of a boundary between two cellular systems.

One approach to performing a handoff between base stations within different systems will now be described with reference to FIG. 2, which shows in schematic form a cellular communications network 30 in which are included a CDMA cellular system (e.g. IS-95 1X) under the control of a CDMA mobile switching center MSCc and a GSM cellular systems under the control of a GSM mobile switching center MSCg. In FIG. 2, there are illustratively represented five such exemplary base stations B1A to B5A respectively located within cells C1A to C5A of the CDMA system, and five base stations B1B to B5B respectively located within the cells C1B to C5B of the GSM system. Although, for convenience of illustration, the cells C1A to C5A and C1B to C5B are shown as being circular, it should be understood that cells will typically be designed to be of other shapes and in reality will have forms dependent on the terrain and topography of the area in which they are located. In what follows cells C1A to C3A and C1B to C3B may be referred to as "border" cells, since these cells are proximate the boundary between the first and second cellular systems. This designation allows the remainder of the cells within each system to be conveniently referred to as "internal" cells.

Figure 3:
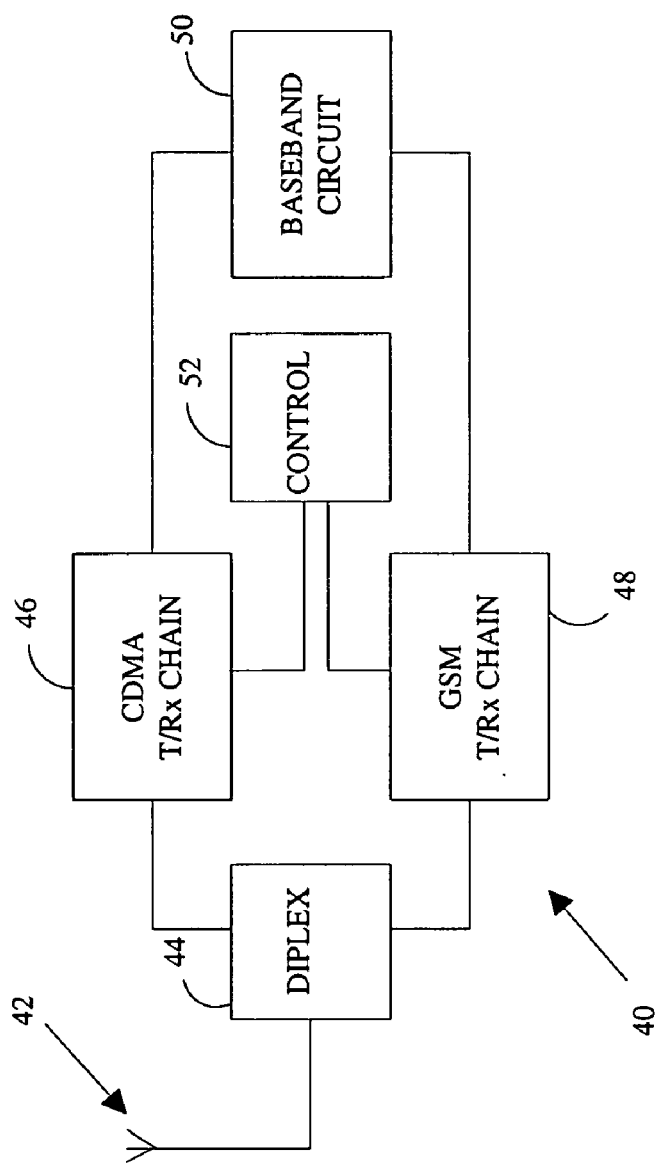
FIG. 3 is a schematic diagram of a dual mode mobile station.

The following description will be given with reference to a mobile station, which is capable of receiving and reacting to signals from base stations within both CDMA and GSM cellular systems. It is contemplated, however, that any types of communication systems may be used, such as CDMA One, CDMA 2000, CDMA 2000 1x, CDMA 2000 3x, High Data Rate Principles (HDR), CDMA 1xEV, CDMA 1xEVDO, TDMA, TDSCDMA, W-CDMA, GPRS and others. To this end, in one embodiment, the mobile station is configured with a dual-band transceiver having a receive chain tuneable to the different operating frequencies of the two cellular systems. A schematic diagram of such a mobile station is given in FIG. 3 of the accompanying drawings. As shown therein the mobile station 40 comprises an antenna 42 connected through a diplexer 44 to both a CDMA transmission and reception chain 46 and a GSM transmission and reception chain 48. The transmission/reception chains 46, 48 are conventional for the respective CDMA and GSM systems. The chains output suitably demodulated and converted data to a convention baseband circuit 50, and receive data for transmission from the baseband circuit 50. The transmission/reception chains 46, 48 are controlled by a controller 52, which, among other things, switches between the two chains in response to command signals from the CDMA or GSM system. Thus, in this embodiment, the two chains are not active at the same time. In another embodiment, the two chains may be active at the same time.

Figure 5:
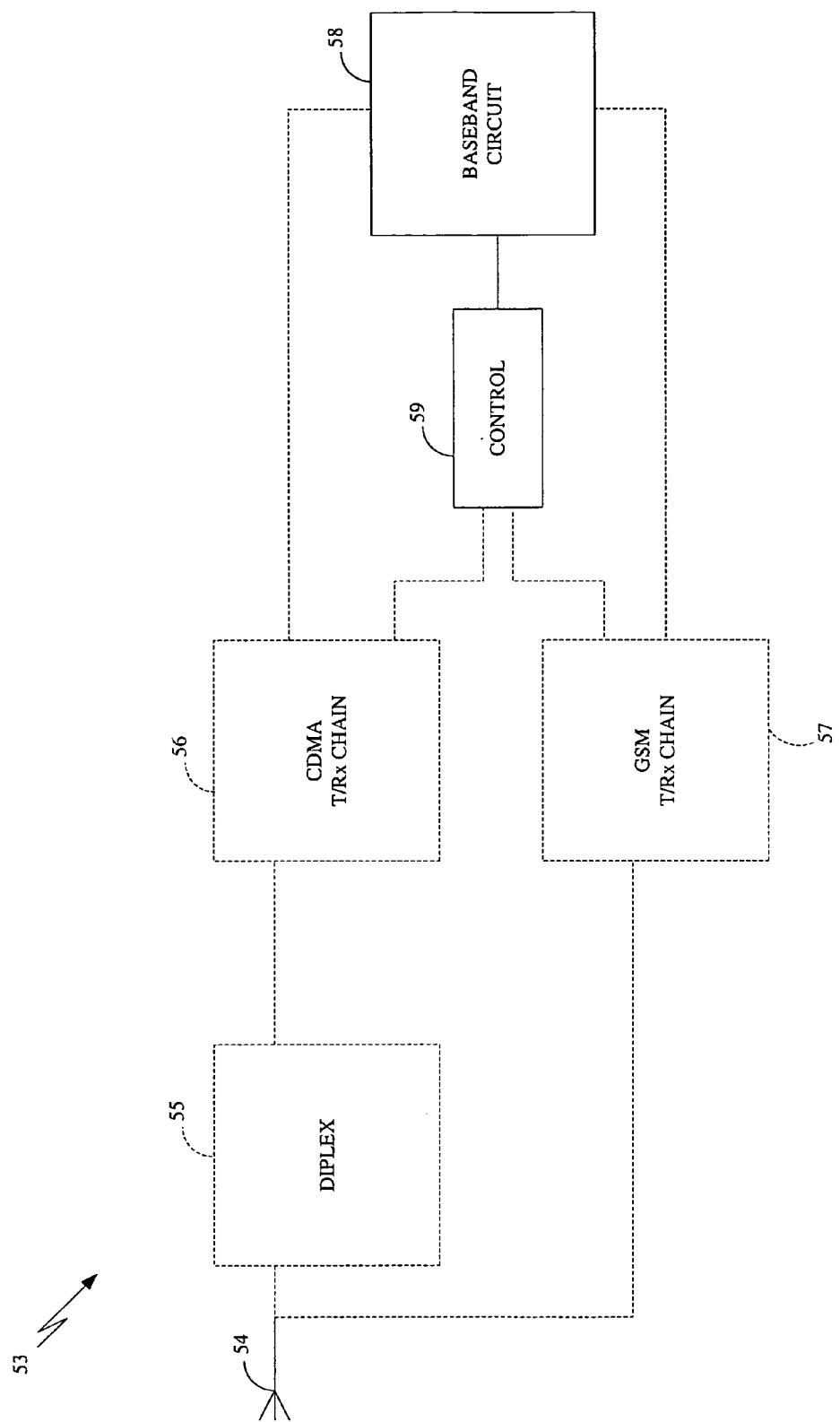
FIG. 5 is a schematic diagram of a single mode mobile station.

In another embodiment, the mobile station is configured with a single transceiver having a receive chain tuneable to one of the two cellular systems. A schematic diagram of such a mobile station is given in FIG. 5 of the accompanying drawings. As shown therein the mobile station 53 comprises an antenna 54 connected through a diplexer 55. The diplexer is connected to either a CDMA transmission and reception chain 56 (if it's a CDMA handset) or a GSM transmission and reception chain 57 (if it's a GSM handset). The transmission/reception chains 56, 57 are conventional for their respective CDMA and GSM systems. The chain output is suitably demodulated and converted data to a convention baseband circuit 58, and receives data for transmission from the baseband circuit 58. The transmission/reception chain, either chain 56 or chain 57, is controlled by a controller 59.

Returning to FIG. 2, the CDMA mobile switching center (MSCc) controls the routing of telephone calls from the public switched telephone network (PSTN) to the appropriate base station B1A to B5A for transmission to the designated mobile station. The CDMA mobile switching center MSCc also controls the routing of calls from the mobile stations within the coverage area of the first cellular system, via at least one base station, to the PSTN. The GSM mobile switching center MSCg operates in a like manner to govern the operation of the base stations B1B to B5B, and to route calls between the PSTN and the GSM cellular system. Control messages and the like are communicated between MSCc and MSCg over an intersystem data link 34.

When a mobile station is located within an internal cell of the CDMA system, the mobile station will typically be programmed to monitor the pilot signal transmissions from each nearby (i.e., internal and/or border) base station. The mobile station then determines which internal cell it is in by comparing pilot signal strength transmitted from the surrounding base stations. When the mobile station approaches the boundary of the internal cell, a mobile-assisted handoff may be initiated in the manner described above with reference to U.S. Pat. No. 5,267,261, for example.

A different situation exists when the mobile station is located within one of the border cells C1A to C3A or C1B to C3B. As an example, consider a case in which the mobile station is located within cell C2A, but is approaching cell C2B. In this instance the mobile station could begin to receive usable signal levels from base station B2B, which would then be reported to base station B2B and to any other base station(s) with which the mobile station is currently in communication. The time at which usable signal levels are being received by a mobile or base station may be determined by measuring one or more quantifiable parameters (e.g., signal strength, signal to noise ratio, frame erasure rate, bit error rate, and/or relative time delay) of the received signal. The mechanism is similar to that described in the above identified U.S. Pat. No. 5,697,055.

If both systems were CDMA systems, then the handoff mechanism described in U.S. Pat. No. 5,697,055 could be used effect the handoff between cell C2A and cell C2B. There is, however, a problem in that there is currently no mechanism for handing off a call using the air interface from a CDMA network to a GSM network. GSM authentication cannot be done because the CDMA mechanisms cannot transfer the data required to do GSM authentication. Encryption in GSM is different than the encryption in CDMA. If new messages are added to the air interface in support of dual-mode mobile stations, then modifications must be made to support these new messages. This is undesirable.

The solution to this problem is to use a generic message containing instructions that enable the mobile station to transfer from the CDMA network to the GSM network. The generic message must be able to convey data necessary to effect GSM authentication and encryption. Preferably, other supplementary features in GSM should also be supported by the generic message. In other words, established GSM protocols must be kept intact so as to minimise any changes in existing GSM systems. Part of the handoff operation includes establishing subscriber identity and once the handoff has been affected it is necessary to maintain signalling and data confidentiality for physical connections (ciphering). The definition and operational requirements of subscriber identity authentication are given in GSM 02.09.

The authentication procedure is also used to set the ciphering key. Therefore, the authentication procedure is performed after the network has established the subscriber identity and before the channel is encrypted. Two network functions are necessary in order to achieve this, namely the authentication procedure itself, and management of authentication and encryption keys within the system.

With this in mind, the idea is to make use of tunnelling mechanisms that may work at any time (during hand-off situations and non-hand-off situations), and may be uni-directional or bi-directional. One type of tunnelling mechanism is the so-called ADDS (Application Data Delivery Service) messages and short data burst messages to transparently pass within the CDMA system GSM parameters that are typically not examined by the GSM Base Station Controller BSC, but are needed by a dual mode mobile station. The use of ADDS messages together with data bursts allows a generic payload to be sent between the mobile service switching centers (MSC) of the networks or other network elements (e.g. SMS, position location server, OTASP). The system takes advantage of this to pass GSM information end-to-end between the network and the mobile station without requiring any changes to the CDMA BSCc or BTSc.

In the network arrangement shown in FIG. 2, ADDS messages that are used to convey GSM handoff data, such as timing information and authentication data from the MSCc through the BSCc to the mobile station. The mobile station then uses so-called MAP (Mobile Application Protocol) messages to convey the handoff data to the MSCg in the GSM network. This requires only a small change to the MSCg to enable it to interpret the data in the MAP messages and control the mobile station accordingly. Other alternatives for transferring the data are, of course, possible.

When the mobile station is at the border between the CDMA and GSM systems (e.g. in cell C2A and approaching cell C2B) the mobile station begins the handoff process by sending a message back to the MSCc notifying the MSCc that conditions are such that the mobile should be handed off to the GSM system.

In a GSM system two types of handoff are available, namely synchronous and asynchronous. For ease of implementation asynchronous handoff is preferred. The mobile station is therefore told that the handoff will be an asynchronous handoff to GSM. After a handoff order is received by the mobile station the mobile first sends a few access bursts to the GSM base station controller BSCg until it receives until it receives back a MAP handoff message which is passed back to the CDMA MSCc to enable GSM authentication data to be generated and provided to the mobile station. GSM has a procedure for asynchronous handoff, with data bursts which help the BSCg to acquire timing for mobile. The ADDS message therefore includes an 'action time' message specifying a specific time for handoff to happen. Only once this data has been received will the mobile start normal transmission.

Another problem with handing off between CDMA and GSM is that CDMA and GSM authentication use two different methods and keys. The authentication methods in GSM and CDMA 1X are basically the same, but the keys have different sizes. CDMA 1X has additional procedures such as Unique Challenge and Count methods, which respectively prevent channel hijacking and replay attacks. For a CDMA physical layer to be used within a GSM system without requiring significant modifications to the GSM MSCg, GSM authentication methods should be re-used over the CDMA physical layer. This provides the advantage of the system not having to support two different types of authentication centers, two types of SIM cards, etc.

The authentication procedure consists of a series of exchanges between the system and the mobile station. The system transmits a non-predictable number RAND to the mobile station. Next, the mobile station computes a result SRES, also known as the signature of the RAND number, using an algorithm known as the A3 algorithm. The A3 algorithm uses RAND and an Individual Subscriber Authentication Key Ki to calculate SRES. The Subscriber Authentication Key Ki is allocated when the customer first subscribes to the service and is stored both in a SIM (subscriber identity module) card and in the Home Location Register (HLR) of the system. Ki is the private key in the encryption and therefore is never transmitted over the network. Finally, the mobile station transmits the signature SRES to the system where it is tested for validity.

Figure 4:
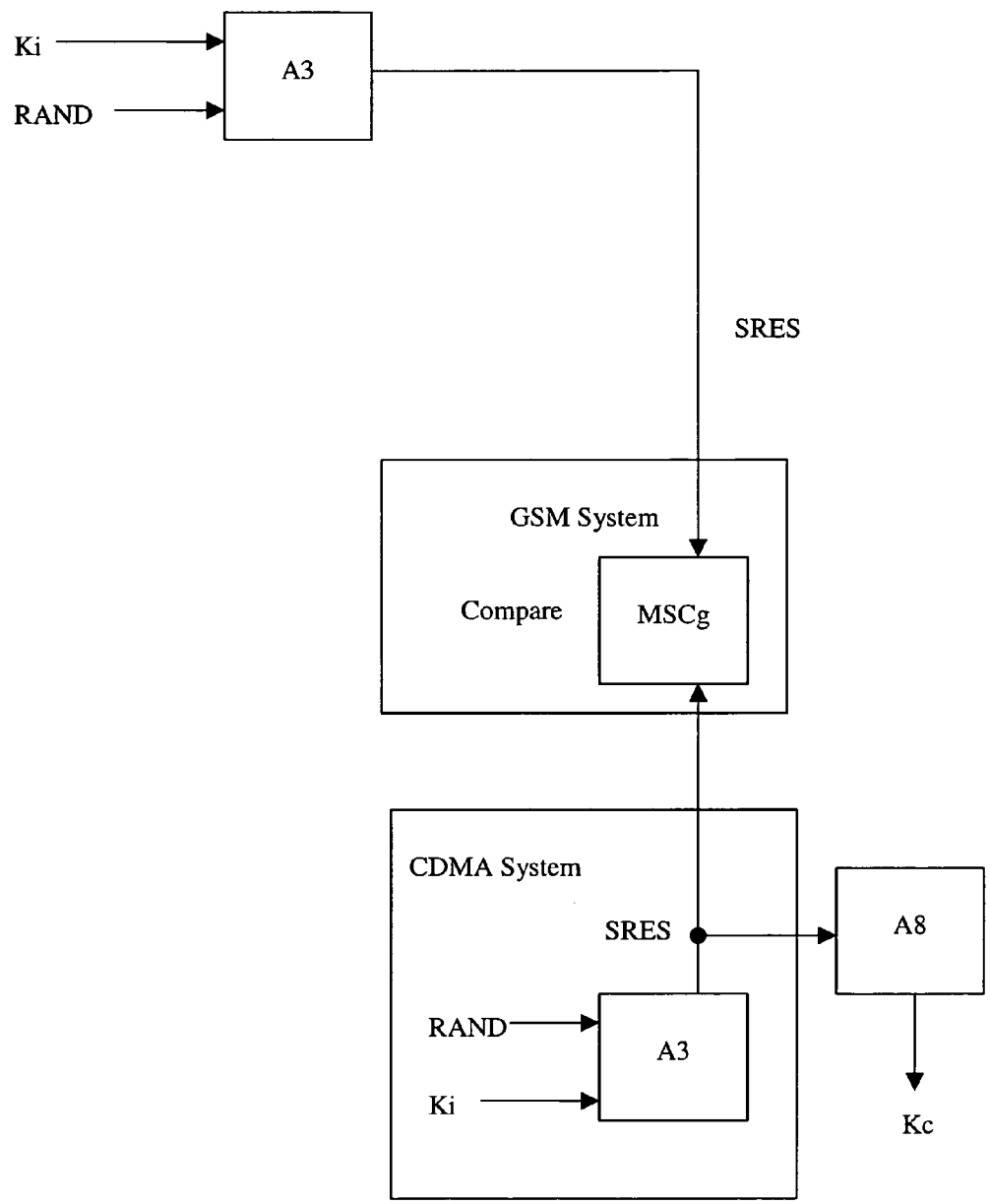
FIG. 4 is a schematic representation of data exchange in a GSM system.

FIG. 4 of the accompanying drawing illustrates how authentication is effected in the GSM MSC. The authentication key in GSM is called Ki and is 128 bits long. The network generates a random number (RAND), which is also 128 bits in length. RAND and Ki are input to the A3 algorithm, which calculates a 32-bit result (SRES) from the input data. The RAND number is also transmitted to the mobile station by way of over the air messages. In a GSM system each mobile station includes a smart card, i.e. the so-called SIM (subscriber identity module) card. Standard SIM commands for authentication are specified in GSM 11.11. These commands are only allowed to be executed if they do not interfere with the correct functioning of the GSM application. If the SIM is removed from the mobile station during a call, the call is terminated immediately, as defined in GSM 11.11.

The SIM in the mobile station also computes SRES by applying the A3 algorithm to the received RAND number and a locally stored copy of Ki. The result of the computation is again SRES and should be the same as the SRES calculated by the network. The result SRES is therefore sent by the mobile station to the network where it is compared with the value of SRES calculated by the network. If both values of SRES are the same then the mobile station is authentic. In the system of FIG. 2 the RAND number is transmitted using the ADDS messages on the air interface and a result SRES is transmitted back.

The value of SRES is also used in an algorithm known as A8 to calculate an 64-bit encryption or ciphering key Kc. The Kc key generated by the GSM authentication and encryption algorithms by the SIM in the mobile station is applied to the CDMA physical layer in place of the private long code mask that would normally be generated using the CDMA CAVE algorithm. The 64-bit Kc key is uniquely mapped to the 42 bit private long code and, thus, is used as a basis for the "private long code mask" to provide for voice privacy. The private long code mask is passed around CDMA messages and interpreted no differently than if it had been generated from the CAVE algorithm. Using this approach for voice privacy allows the system to keep a unique authentication center and unique SIM types, within the hybrid CDMA/GSM network.

GSM performs encryption at the frame level. Every frame is encrypted using the frame number and the 64-bit Kc key, which key is derived as discussed with reference to FIG. 4. The frame number and Kc mask is applied to every frame. In the CDMA 1X system the encryption is performed using a 42-bit private long code. In the hybrid system of FIG. 2 the Kc key is used to derive a 42-bit private long code mask, with a mapping algorithm mapping between Kc and the private long code. This mapping is performed in the MSCc, which then simply tells the BSC which private long code to use.

The ADDS operation allows the transfer of transparent services between terrestrial network elements (e.g. MSC, SMS, PDC) and the mobile station. The system uses this operation to transfer the Authentication information RAND to the MS and to transfer SRES back to the MSC. The ADDS messaging operation goes from the MSCc to the BSCc, and allows data to be sent to the mobile station over the paging channel. The ADDS Transfer operation goes from the BSCc to the MSCc and allows data to be sent to the network from the mobile station over the access channel. The ADDS Deliver operation goes from the MSCc to the BSCc, or BSCc to MSCc and allows data to be sent between the mobile station and the network over the traffic channel. An ADDS parameter has been defined as "ADDS User Part", which contains a 6-bit "Data Burst Type" that indicates the format of the application data message. The ADDS operation utilizes the ADDS User Part parameter to contain the service-specific data. The authentication operation makes use of the ADDS User Part to carry the authentication data. The described system uses a new Data Burst Type named "GSM-MAP Authentication" which is interpreted accordingly by the mobile station.

It should be noted that the exemplary embodiments may be implemented whenever a database for storing information pertaining to the authentication process exists at the receiving end, or is accessible by the receiving end. The processor of the exemplary embodiments may be used to implement one cryptographic scheme with one party and another cryptographic scheme with another party. The basic implementation of the exemplary embodiments may be performed without the need for physical connection to intermediary resources because communication with separate parties occur through a wireless medium.

Those of skill in the art would understand that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality,. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, flowcharts, windows, and steps described in connection with the embodiments disclosed herein may be implemented or performed in hardware or software with an application-specific integrated circuit (ASIC), a programmable logic device, discrete gate or transistor logic, discrete hardware components, such as, e.g., registers in the FIFO, a processor executing a set of firmware instructions, any conventional programmable software and a processor, a field programmable gate array (FPGA) or other programmable logic device, or any combination thereof. The processor may advantageously be a micro-controller, but in the alternative, the processor may be any conventional processor, controller, micro-controller, or state machine. The software may reside in RAM memory, flash memory, ROM memory, EPROM memory, EEPROM memory, hard disk, removable disks, a CD-ROM, a DVD-ROM, registers, or any other magnetic or optical storage media. Those of skill of the art would further appreciate that the data, instructions, commands, information, signals, bits, symbols, and chips that may be referenced throughout the above description are advantageously represented by voltages, currents, electromagnetic waves, magnetic field or particles, optical fields or particles, or any combination thereof.

Having thus described the invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

The invention claimed is:

1. A method of effecting handoff of a mobile station from a first base station in a first cellular communications system controlled by a first mobile switching control station to a second base station in a second cellular system controlled by a second mobile switching control station, said first cellular communications system being a CDMA system, and said second cellular system being a GSM system, the method comprising:

measuring at the mobile station a first parameter of a first signal transmitted by said first base station;

measuring at the mobile station a second parameter of a second signal transmitted by said second base station, wherein said first and second parameters correspond to signal strength;

communicating a signal quality message from the mobile station via the first base station to said first mobile switching control station, when the first and second parameters reach a predetermined condition;

generating at the first mobile switching control station an Application Data Delivery Service (ADDS) message containing handoff data, the ADDS message being a type of tunneling mechanism which transparently passes within the CDMA system GSM parameters;

communicating the ADDS message from said first mobile switching control station to said mobile station;

generating at the mobile station a Mobile Application Protocol (MAP) message containing the handoff data; and communicating the MAP message from the mobile station to the second mobile switching control station.

2. A mobile station comprising:

a first transceiver chain operable to receive and transmit signals with a first base station in a first cellular communications system, said first cellular communications system being a CDMA system;

a second transceiver chain operable to receive and transmit signals with a second base station in a second cellular communications system, said second cellular communications system being a GSM system; and a controller for:

measuring a first parameter of a first signal transmitted by said first base station;

measuring a second parameter of a second signal transmitted by said second base station, wherein said first and second parameters correspond to signal strength;

communicating a signal quality message from the mobile station via the first base station to said first cellular communications system, when the first and second parameters reach a predetermined condition;

receiving from the first base station an Application Data Delivery Service (ADDS) message containing handoff data, the ADDS message being a type of tunneling mechanism which transparently passes within the CDMA system GSM parameters;

generating a Mobile Application Protocol (MAP) message containing the handoff data; and communicating the MAP message to the second base station.

3. An apparatus for effecting handoff of a mobile station from a first base station in a first cellular communications system controlled by a first mobile switching control station to a second base station in a second cellular system controlled by a second mobile switching control station, said first cellular communications system being a CDMA system, and said second cellular system being a GSM system, the method comprising:

means for measuring at the mobile station a first parameter of a first signal transmitted by said first base station;

means for measuring at the mobile station a second parameter of a second signal transmitted by said second base station, wherein said first and second parameters correspond to signal strength;

means for communicating a signal quality message from the mobile station through the first base station to said first mobile switching control station, when the first and second parameters reach a predetermined condition;

means for generating at the first mobile switching control station an Application Data Delivery Service (ADDS) message containing handoff data, the ADDS message being a type of tunneling mechanism which transparently passes within the CDMA system GSM parameters;

means for communicating the ADDS message from said first mobile switching control station to said mobile station;

means for generating at the mobile station a Mobile Application Protocol (MAP) message containing the handoff data; and means for communicating the MAP message from the mobile station to the second mobile switching control station.

* * * * *